(12) United States Patent
Miller

(10) Patent No.: US 12,259,017 B2
(45) Date of Patent: Mar. 25, 2025

(54) SOUND ISOLATION SUSPENSION SYSTEM

(71) Applicant: KONINKLIJKE PHILIPS N.V., Eindhoven (NL)

(72) Inventor: Kevin Arnold Miller, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 336 days.

(21) Appl. No.: 17/770,699

(22) PCT Filed: Oct. 20, 2020

(86) PCT No.: PCT/EP2020/079533
§ 371 (c)(1),
(2) Date: Apr. 21, 2022

(87) PCT Pub. No.: WO2021/078757
PCT Pub. Date: Apr. 29, 2021

(65) Prior Publication Data
US 2022/0381319 A1    Dec. 1, 2022

Related U.S. Application Data

(60) Provisional application No. 62/923,865, filed on Oct. 21, 2019.

(51) Int. Cl.
*F16F 15/073* (2006.01)
*F16F 7/116* (2006.01)
*H02K 5/24* (2006.01)

(52) U.S. Cl.
CPC ............ *F16F 15/073* (2013.01); *F16F 7/116* (2013.01); *H02K 5/24* (2013.01)

(58) Field of Classification Search
CPC ........ F16F 15/03; F16F 15/067; F16F 15/073; F16F 7/116; H02K 5/24; A61C 17/02
See application file for complete search history.

(56) References Cited

U.S. PATENT DOCUMENTS

| | | | |
|---|---|---|---|
| 4,161,812 A | 7/1979 | Litch, III | |
| 4,891,955 A * | 1/1990 | Klausing | F16F 15/067 62/297 |

(Continued)

FOREIGN PATENT DOCUMENTS

| | | |
|---|---|---|
| CN | 201840540 U | 5/2011 |
| CN | 201870758 U | 6/2011 |

(Continued)

OTHER PUBLICATIONS

International Search Report and Written Opinion Dated Apr. 8, 2021 for International Application No. PCT/EP2020/079533 Filed Oct. 20, 2020.

*Primary Examiner* — Vishal R Sahni

(57) ABSTRACT

A suspension system (22) configured to minimize transmission of acoustic and vibrational energy in a device, comprising: (i) a rigid support (24); (ii) an operative element (16) positioned within the rigid support and comprising a drive frequency when the device is in operation; and (iii) a resilient element (26) engaging the rigid support and configured to create a resilient force against one or more degrees of freedom of vibrations generated by the operative element; wherein the natural frequency in one or more of the degrees of freedom of the suspension system, in the degrees of freedom of interest, are tuned into a narrow resonant frequency range by the suspension, and wherein the resonant frequency is less than the drive frequency.

16 Claims, 13 Drawing Sheets

(56) References Cited

U.S. PATENT DOCUMENTS

| | | | | |
|---|---|---|---|---|
| 6,076,795 | A * | 6/2000 | Scheidel | F04D 29/668 |
| | | | | 248/605 |
| 8,044,629 | B2 * | 10/2011 | Fallahi | F16F 7/1005 |
| | | | | 318/116 |
| 11,213,376 | B2 | 1/2022 | Senff et al. | |
| 2002/0017749 | A1 | 2/2002 | Fujita et al. | |
| 2006/0002228 | A1 * | 1/2006 | Schulz | B01F 29/10 |
| | | | | 366/217 |
| 2018/0034344 | A1 * | 2/2018 | Hitchcock | H02K 5/24 |
| 2018/0128418 | A1 * | 5/2018 | Bullard | F16F 1/025 |

FOREIGN PATENT DOCUMENTS

| | | | | | |
|---|---|---|---|---|---|
| CN | 106286692 | A * | 1/2017 | | F16F 15/002 |
| DE | 60021229 | T2 * | 5/2006 | | F16F 15/03 |
| DE | 202012004614 | U1 | 5/2012 | | |
| EP | 1825827 | A2 | 8/2007 | | |
| EP | 2744442 | B1 | 5/2019 | | |
| GB | 2265669 | A | 10/1993 | | |
| IT | 1078114 | B * | 5/1985 | | B60B 9/26 |
| JP | H0342077 | U | 4/1991 | | |
| JP | H0435647 | A | 2/1992 | | |
| JP | 2000337439 | A * | 12/2000 | | F16F 15/02 |
| KR | 100266432 | B1 * | 10/2000 | | |
| WO | 2008053455 | A1 | 5/2008 | | |
| WO | WO-2017132284 | A1 * | 8/2017 | | A61C 1/0092 |
| WO | 2018206806 | A1 | 11/2018 | | |
| WO | 2019025249 | A1 | 2/2019 | | |
| WO | 2019120083 | A1 | 6/2019 | | |

* cited by examiner

SOUND ISOLATION SUSPENSION SYSTEM

This application is the U.S. National Phase application under 35 U.S.C. § 371 of International Application No. PCT/EP2020/079533, filed on Oct. 20, 2020, which claims the benefit of U.S. application No. 62/923,865, filed Oct. 21, 2019. These applications are hereby incorporated by reference herein.

FIELD OF THE DISCLOSURE

The present disclosure is directed generally to a suspension system configured to minimize transmission of acoustic and vibrational energy generated by a pump or motor to an external housing to reduce audible noise perceived by a user.

BACKGROUND

Due to moving or vibrating components, devices can be noisy and exhibit unwanted vibrations. The noise or vibration associated with a consumer device may limit or prevent use of the device due to the volume of sound for the user or concern of the user for other individuals who may be disturbed. This can lead to dissatisfaction with a consumer device, inconsistent use of the device, or failure to use the device, thus reducing or preventing the full potential benefit that can be gained by use of the device.

An oral irrigator is just one example of a consumer device that generates unwanted noise and vibration. An oral irrigator pumps liquid from a fluid reservoir at low pressure through a pump into a high pressure line that exits through a nozzle. The principal source of noise and vibration are the fluid path, pump and drive train, and nozzle. The pump and drive train will be the source for most of this vibration, and creates sound and vibration impulses of a fixed frequency that also excite harmonics. Transmission of these vibrations to external surfaces generates the majority of sound heard by a user. These primary sound and vibration sources then transmit to secondary sources, which are energized from the principal frequency and/or harmonics to move parts exposed to the user and/or external air, radiating sound vibrations from the principal forces to the user. Additionally, secondary sound sources can be magnified by resonances and intermittent contacts. Indeed, secondary sound sources with large surface areas generate sound much more efficiently for a given vibration.

Prior art devices use several different mechanisms or designs in an attempt to reduce the noise and vibration associated with a moving or vibrating component. For example, some systems attempt to modify the moving or vibrating component to lessen noise and vibration, which may negatively affect operation and/or effectiveness of the device. Other devices employ suspension systems that may reduce vibrations but are typically bulky, expensive, and minimally effective.

SUMMARY OF THE DISCLOSURE

There is a continued need for suspension systems that reduce the transmission of noise and vibration frequencies from an internal component to external surfaces. Various embodiments and implementations herein are directed to a method and system configured to minimize transmission of acoustic and vibrational energy. The system comprises an internal rigid support, and an operative element such as a pump assembly positioned within the rigid support. The operative element comprises a drive frequency when the device is in operation. The system also includes an internal suspension comprising a resilient element, such as a spring, engaging the rigid support and configured to create a resilient force against one or more degrees of freedom of vibrations generated by the operative element. The system is configured such that the natural frequency in one or more of the degrees of freedom of the suspension system are tuned into a narrow resonant frequency range by the suspension, such that the resonant frequency is less than the drive frequency.

Sound loudness as perceived by a user is defined by the A-weighting scale. A user can perceive frequencies in the mid-range much easier than other ranges, and thus hears frequencies in this range louder than lower and higher frequencies. According to just one embodiment of a possible device, the primary frequencies from the operative element of the device are 8 to 30 Hz, with those below 20 Hz not being heard. The lower the frequency from the operative element, the less reaction force from the operative element. Utilizing a suspension with a natural frequency in the 5 Hertz range isolates vibrations that are easily heard, reducing A-weighted sound power while providing a low-cost practical suspension to build into the device. Alternatively, the primary frequencies from the operative element of the device could be in the range of 15 Hz and the suspension could be designed to comprise a natural frequency in the 10 Hz range.

Generally, in one aspect, a suspension system configured to minimize transmission of acoustic and vibrational energy in a device is provided. The suspension system includes: (i) a rigid support; (ii) an operative element positioned within the rigid support and comprising a drive frequency when the device is in operation; and (iii) a resilient element engaging the rigid support and configured to create a resilient force against one or more degrees of freedom of vibrations generated by the operative element; where the natural frequency in one or more of the degrees of freedom of the suspension system, in the degrees of freedom of interest, are tuned into a narrow resonant frequency range by the suspension, and wherein the resonant frequency is less than the drive frequency.

According to an embodiment, the device is an oral irrigator and the operative element is a pump assembly.

According to an embodiment, the suspension comprises one or more resilient elements configured to create a resilient force against all six degrees of freedom of vibrations generated by the operative element and further configured to center the operative element within an intended operating position free of other components except for the one or more resilient elements when positioned upright for normal operation under gravitational load.

According to an embodiment, the resilient element comprises three or more metal springs in tension supporting the operative element.

According to an embodiment, the resilient element is a non-linear resilient element connecting the operative element with the rigid support and centering the operative element within a low force region of the non-linear resilient element and an intended operating position free of other components except for the non-linear resilient element when positioned upright for normal operation under gravitational load.

According to an embodiment, the non-linear resilient element comprises one or more opposing magnets.

According to an embodiment, the non-linear resilient element comprises a series of resilient elements configured such that the series of resilient elements each engage when the operative element leaves an intended operating position, thereby increasing stiffness of the series of resilient elements when oriented other than the intended operational position to stop unwanted impact of the device.

According to an embodiment, the non-linear resilient element comprises one or more springs selected from the group consisting of a conical spring, a barrel spring, a dual-pitch coil spring, and combinations thereof.

According to an embodiment, the one or more springs comprise a staircase arrangement of leaf spring elements connected in a plurality of different orientations to create a compact resilient element.

According to an embodiment, the resonant frequency is approximately 5 Hertz.

According to an embodiment, the drive frequency is between approximately 10 and 30 Hertz.

According to an embodiment, the suspension system is configured to limit movement of the operative element to less 10 mm in any direction from an intended operating position.

According to an aspect is provided a device comprising a suspension system configured to minimize transmission of acoustic and vibrational energy generated by the device, comprising: (i) a housing; (ii) an operative assembly positioned within the housing and comprising a drive frequency when the handheld device is in operation; (iii) a resilient element connecting the operative assembly with the housing; and where the natural frequencies of the suspension system are tuned into a resonant frequency below 10 Hertz by the elastomeric element and the resilient element, and wherein the resonant frequency is less than the drive frequency.

According to an embodiment, the device is an oral irrigator and the operative element is a pump assembly.

According to an embodiment, the device further includes a rigid support positioned between the housing and the operative assembly, wherein the operative assembly is positioned within the rigid support, and wherein the resilient element connects the operative assembly to the rigid support and the resilient element connects the lower portion of the operative assembly to the rigid support.

According to an embodiment, the resonant frequency is approximately 5 Hertz.

According to an embodiment, the drive frequency is between approximately 10 and 30 Hertz.

According to an embodiment, wherein the resilient element comprises three or more metal springs in tension supporting the operative element.

According to an embodiment, the resilient element is a non-linear resilient element connecting the operative element with the rigid support and centering the operative element within a low force region of the non-linear resilient element and an intended operating position free of other components except for the non-linear resilient element when positioned upright for normal operation under gravitational load.

According to an embodiment, the non-linear resilient element comprises one or more springs selected from the group consisting of a conical spring, a barrel spring, a dual-pitch coil spring, and combinations thereof.

According to an embodiment, the non-linear resilient element comprises one or more opposing magnets.

According to an embodiment, the one or more springs comprise a staircase arrangement of leaf spring elements connected in a plurality of different orientations to create a compact resilient element.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. The figures showing features and ways of implementing various embodiments and are not to be construed as being limiting to other possible embodiments falling within the scope of the attached claims. Also, the drawings are not necessarily to scale, emphasis instead generally being placed upon illustrating the principles of the various embodiments.

FIG. 8 is a graph of natural frequency of a suspension system versus the fundamental frequencies of an operative element, in accordance with an embodiment.

DETAILED DESCRIPTION OF EMBODIMENTS

The present disclosure describes various embodiments of a device configured to reduce the transmission of noise and vibration frequencies from an internal component to external surfaces. More generally, Applicant has recognized and appreciated that it would be beneficial to provide a suspension system within a device that more accurately and affordably minimizes transmission of acoustic and vibrational energy. The suspension system comprises a rigid support, an operative element such as pump assembly positioned within the rigid support and comprising a drive frequency when the device is in operation, and a suspension comprising a resilient element engaging the rigid support and configured to create a resilient force against one or more degrees of freedom of vibrations generated by the operative element.

The suspension system is configured such that the natural frequency in one or more of the degrees of freedom of the suspension system are tuned into a narrow resonant frequency range, where the resonant frequency is less than the drive frequency. For example, the drive frequency may be less than approximately 85 Hertz ("Hz"), or less than approximately 65 Hz, such as at approximately 10 to 30 Hz although other ranges are possible. The suspension system is configured such that the natural frequency in one or more of the degrees of freedom of the suspension system is approximately 5 Hertz and is thus lower than the drive frequency.

Figure 1:
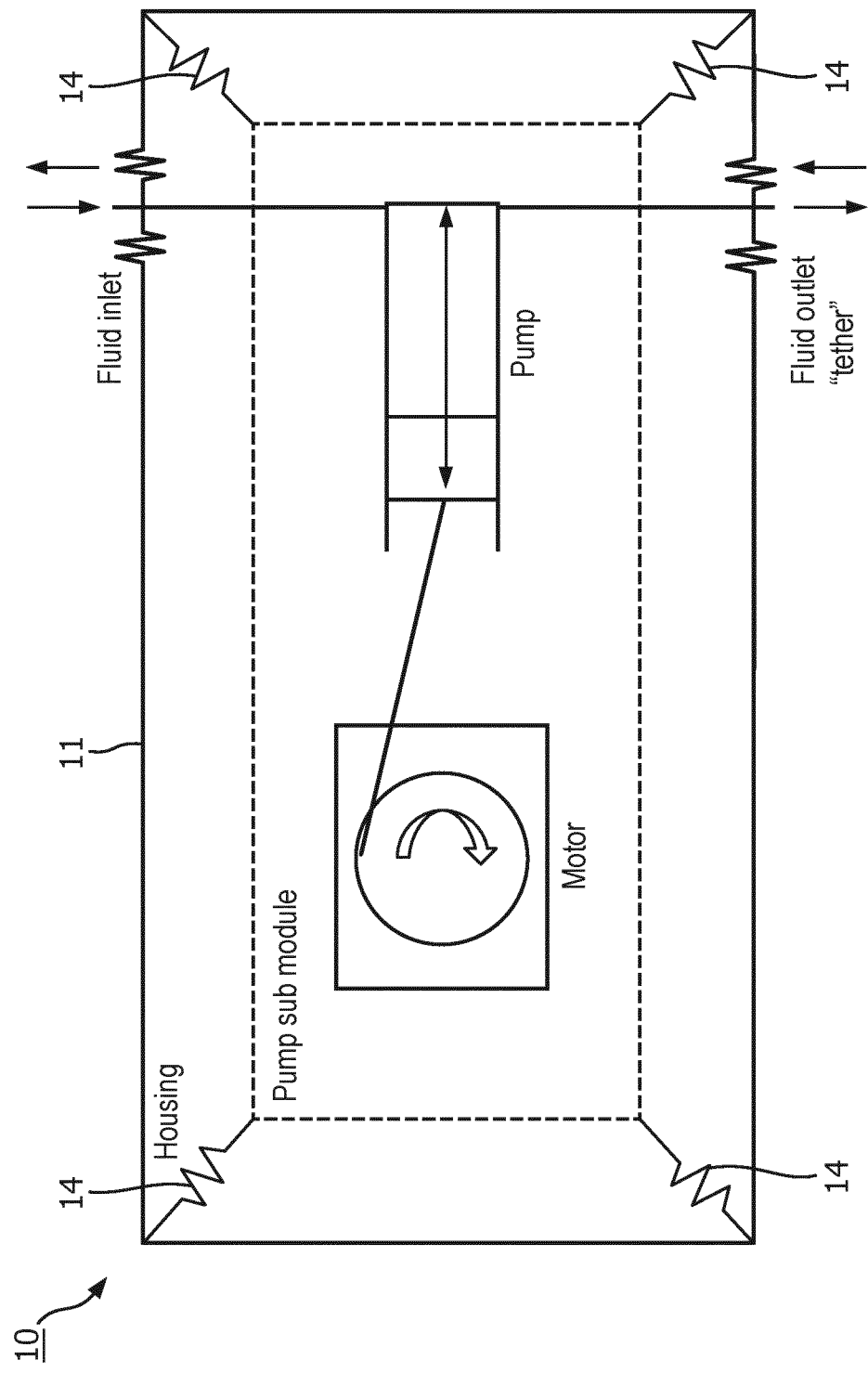
FIG. 1 is a schematic representation of forces within a device, in accordance with an embodiment.

Referring to FIG. 1, in one embodiment, is a schematic representation of a basic sound and vibration isolation system within a device 10. Device 10 may represent, for example, an oral irrigator, another handheld device, another consumer device, or any other device with a housing 11. In this example, the system comprises a fluid inlet and a fluid outlet, which utilizes a motor and a pump configured to move the fluid from the inlet to the outlet. According to an embodiment, system 10 comprises one or more resilient elements 12 configured to suspend at least a portion of the internal components of the system, including the motor and/or pump. The suspension system comprising one or more resilient elements is configured to minimize the transmission of vibration and sound from the internal operative element, such as a motor or pump, to the housing, thereby improving the user experience. Accordingly, resilient elements 12 can be any resilient element configured to isolate and/or dampen sound and vibration, including but not limited to springs, magnets, elastomers, and many other resilient elements.

Figure 2:
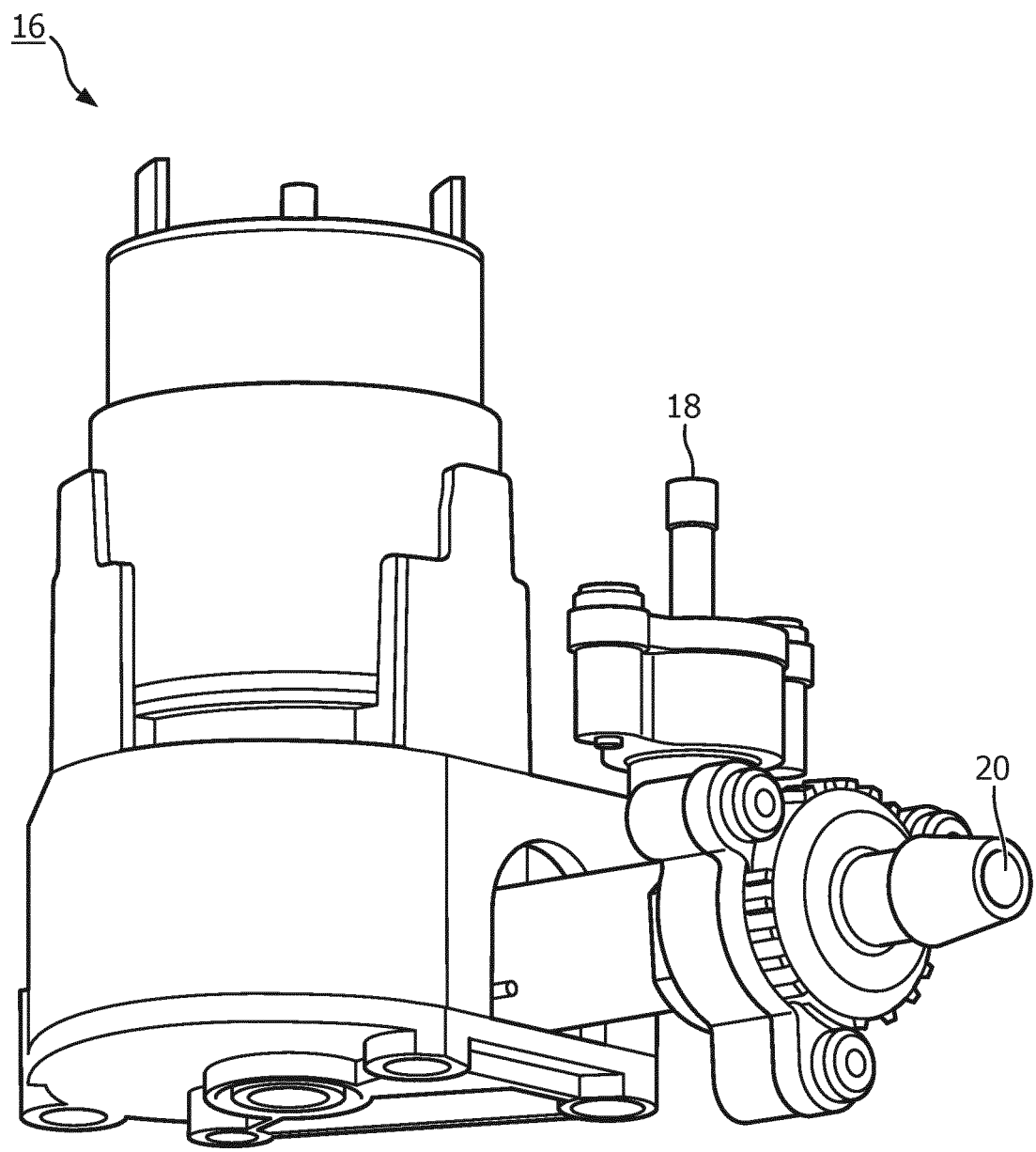
FIG. 2 is a schematic representation of an operative element of a device, in accordance with an embodiment.

Referring to FIG. 2, in one embodiment, is a schematic representation of an assembled operative element 16. In this embodiment the operative element is a pump comprising an inlet 18 and an outlet 20. The device comprises this operative element within a house of the device, which pumps fluid from the inlet to the outlet. According to just one embodiment of many possible embodiments, the operative element pumps fluid from a fluid reservoir at low pressure through the pump into a high pressure line exiting from the outlet. The operative element may operate at a wide range of different frequencies, and in this embodiment the operative element functions at less than approximately 85 Hz, or less than approximately 65 Hz, such as at approximately 10 to 30 Hz although other ranges are possible. In this device, the primary source of noise and vibration will be the fluid path and the pump and drive train. The pump and drive train will be the source for most of this vibration creating repeatable sound/vibration impulses of a fixed frequency that will also excite harmonics. Transmission of this vibration to external surfaces generates the majority of sound heard by a user, and these primary sound/vibration sources then transmit to secondary sources. These secondary sources are energized from the principal frequency and/or harmonics that move parts exposed to the user/external air that radiate sound vibrations from the principal forces to the user. Secondary sound sources can be magnified by resonances and intermittent contacts. Secondary sound sources with large surface areas generate sound much more efficiently for a given vibration.

Functioning of the suspension system results in the generation of one or more natural frequencies at which the system can resonate of which the first six lowest frequencies are considered primary modes. A primary mode frequency may be, for example, the frequency that excites the system and causes it to vibrate or move in those modes. An embodiment of the operative element may comprise, for example, six primary modes which are the first three translation modes and three rotational modes. Translation is when the center of gravity of the suspended operative element moves in a line, and rotation is when the suspended operative element rotates around a pole which would conduce with the center of gravity of the suspended operative element. Depending on the embodiment of the device and/or operative element, one or more modes may not be present.

According to an embodiment, the operative element of a device may operate at a specific frequency range such as approximately 10 to 30 Hz, among many other possible ranges. To avoid resonant effects, the natural frequencies of the suspended system need to be either below or above this range. Natural frequencies are determined from the mass of the operative element, and the stiffness of the suspension. Since the mass of the operative element is essentially fixed, the stiffness is the primary parameter that can be varied to tune the suspension. According to an embodiment, the suspension system is configured to limit movement of the pump assembly to less 10 mm in any direction. The non-linear spring rate allows for a soft suspension when normal oriented and a more rigid suspension when oriented in other directions to prevent banging that makes the device seem inoperable while allowing it to be small in size.

According to an embodiment, a suspension system for a device with an operative element may have several requirements for sound and vibration reduction, as well as other design specifications. According to an embodiment, the suspension system should be designed or structured to operate such that the first six natural frequencies of the suspension system and operative element are close to the operative element operating frequencies, but far enough away from the operative element operating frequencies to avoid resonance. It may also be desirable to ensure that the suspension system is affordable, fits within the provided housing, and is robust enough to survive normal use including dropping.

High damping by the suspension system will increase the transmissibility of vibration through the suspension and is not desirable in most embodiments. For example, high or critical damping means that the system loses energy quickly and this lost energy is transmitted through the suspension to the external housing. A non-critically damped system maintains more of its energy for a longer time. Critically damped means the system would not oscillate more than one cycle after being excited.

Figure 3:
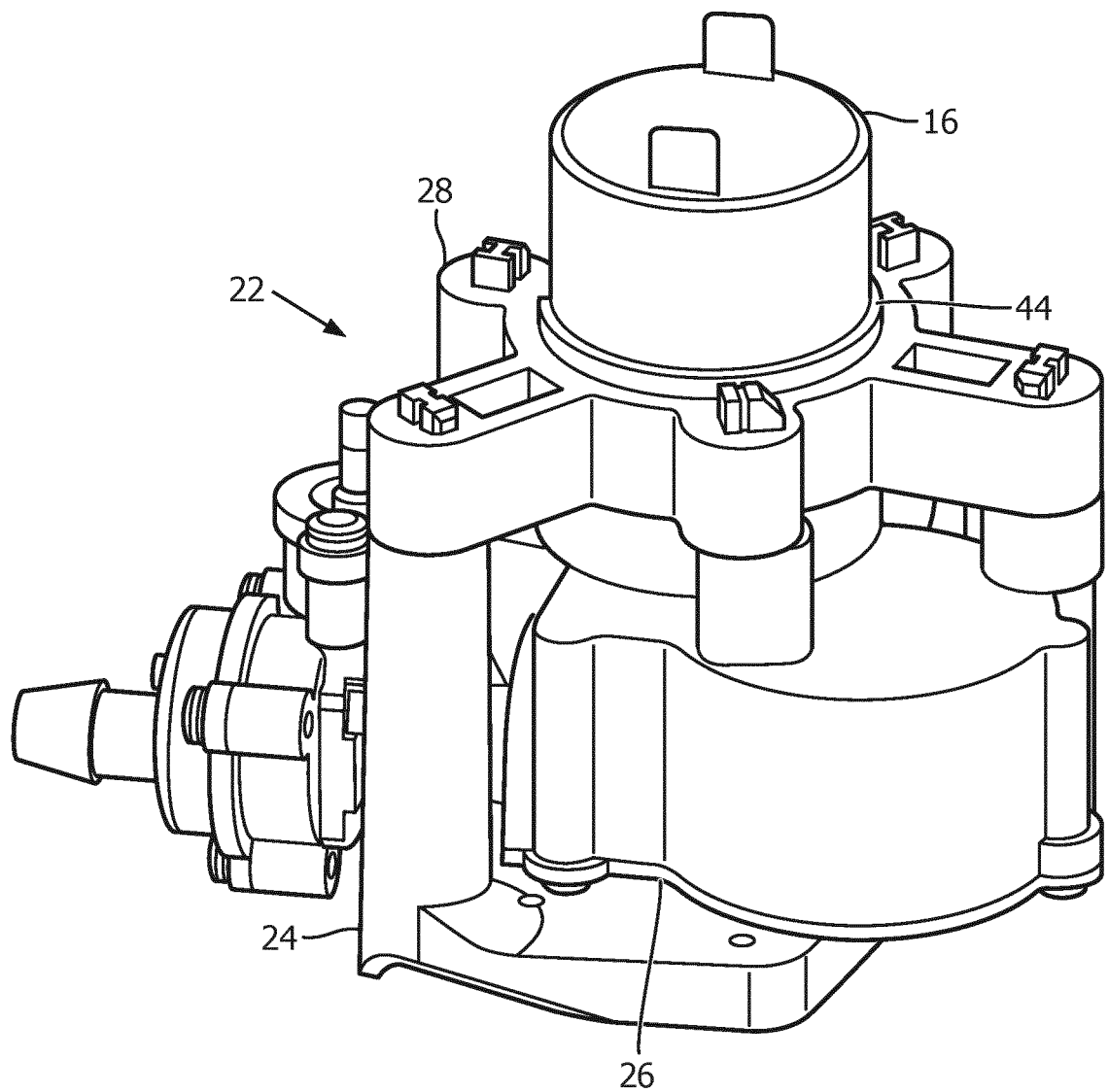
FIG. 3 is a schematic representation of one embodiment of a suspension system, in accordance with an embodiment.

Referring to FIG. 3, in one embodiment, is a schematic representation of an assembled suspension system 22 with an operative element 16, in which the operative element is suspended within the suspension system. The natural frequency in one or more of the degrees of freedom of the suspension system are tuned into a narrow resonant frequency range by the suspension, and the resonant frequency of the assembled suspension system 22 is less than the drive frequency of operative element 16. Although FIG. 3 depicts an embodiment of a suspension system 22 and an operative element 16, this embodiment is a non-limiting example. The operative element 16 may be any other operative element 16, and the suspension system may be otherwise structured or configured such that the natural frequency in one or more of the degrees of freedom of the suspension system are tuned into a narrow resonant frequency range by the suspension and the resonant frequency of the assembled suspension system is less than the drive frequency of the operative element.

According to this embodiment, suspension system 22 comprises a rigid support 24. The rigid support is an interface between the operative element 16 and one or more elements of the suspension, with the housing or other fixed structure within the device. For example, the rigid support 24 supports the operative element 16 and one or more elements of the suspension, and facilitates the positioning of the operative element 16 and the other elements of the suspension in order to minimize sound and vibration of the operative element by tuning its natural frequencies into a narrow resonant frequency range less than the drive frequency of the operative element. Rigid support 24 may be composed of any material sufficient to support the weight of at least the operative element 16, as well as sufficiently resist the forces exerted by the operative element 16 and restrict excessive movement, and avoid deformation over time.

Although not shown, the suspension system further includes a resilient element 26 positioned between the rigid support 24 and the operative element 16. The resilient element 26 is an interface between the rigid support and the operative element, and supports the weight of the operative element. Resilient element 26 may be any component, device, or mechanism that exerts a bias and/or absorbs energy. For example, the resilient element may be one or more of any type of spring, magnet, polymer, or other material or structure that exerts a bias and/or absorbs energy. For example, in this embodiment, resilient element 26 is a spring that exerts a bias against the rigid support and/or operative element, and absorbs energy from the operative frequencies generated by the operative element. According to an embodiment, the resilient element is configured to create a resilient force against all six degrees of freedom of vibrations generated the operative assembly.

In some embodiments, suspension system 22 may further comprise a second resilient element 28 positioned between the rigid support 24 and the operative element 16 and configured to further minimize and/or absorb energy from the operative frequencies generated by the operative element. Thus, the first and second resilient elements minimize sound and vibration of the operative element to tune the natural frequencies into a narrow resonant frequency range less than the drive frequency of the operative element.

Although FIG. 3 depicts an embodiment of a second resilient element 28, this embodiment is a non-limiting example. In this example, the second resilient element 28 is an interface between the rigid support and the operative element. Resilient element 28 may be any component, device, or mechanism that exerts a bias and/or absorbs energy. For example, the resilient element may be one or more of any type of spring, magnet, polymer, or other material or structure that exerts a bias and/or absorbs energy. For example, in this embodiment, resilient element 28 is a natural or synthetic polymer having elastic properties, such as an elastomer. For example, a resilient element may comprise a silicone material, among other possible materials. The second resilient element 28 also comprises an opening 44 that allows a portion of the operative element 16 to extend through. In other embodiments the second resilient element 28 may be positioned above the operative element.

Figure 4:
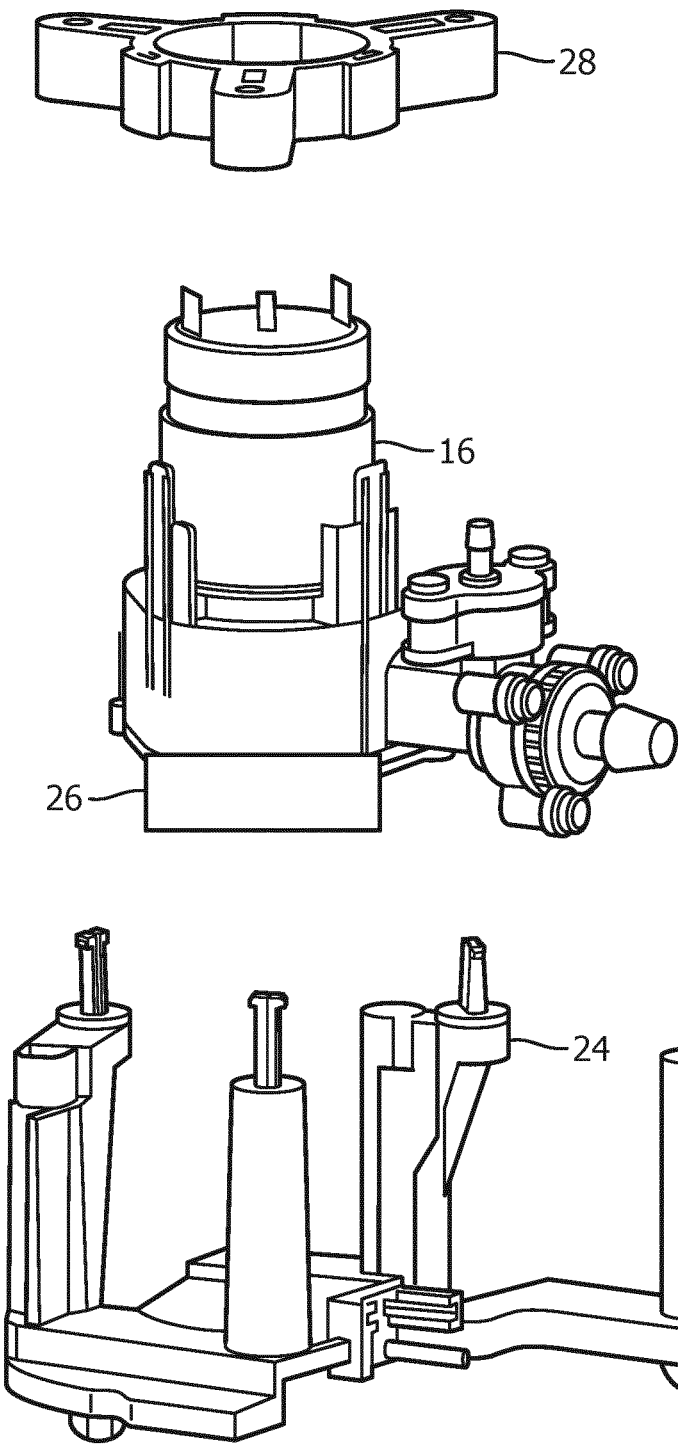
FIG. 4 is an exploded view of one embodiment of a suspension system, in accordance with an embodiment.

Referring to FIG. 4, in one embodiment, is an exploded view of a portion of a device comprising a suspension system configured to tune the natural frequencies of the system into a narrow resonant frequency range less than the drive frequency of the operative element. Although FIG. 4 depicts a specific embodiment of this portion of a device, this embodiment is a non-limiting example. The suspension system comprises a rigid support 24, first resilient element 26, and optionally a second resilient element 28, configured to contain operative element 16.

Figure 5:
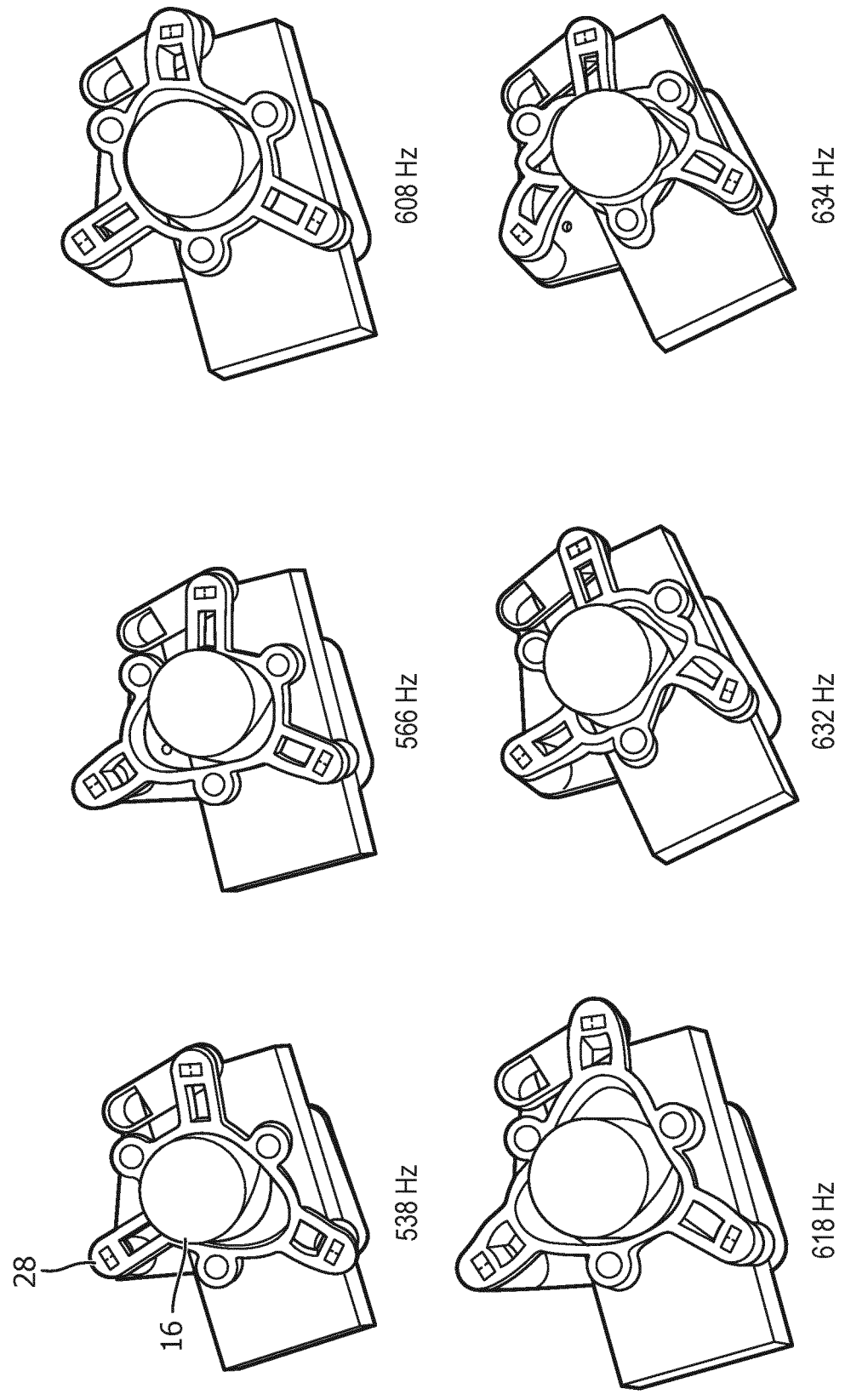
FIG. 5 is a schematic representation of natural frequencies of one embodiment of a suspension system, in accordance with an embodiment.

Referring to FIG. 5 is a series of schematic representations depicting six natural frequencies of an embodiment of the suspension system. The representations show the second resilient element 28 of the suspension system relative to a portion of the operative element 16. The representations depict forces exerted on, for example, the second resilient element 28 by the natural frequencies.

Figure 6:
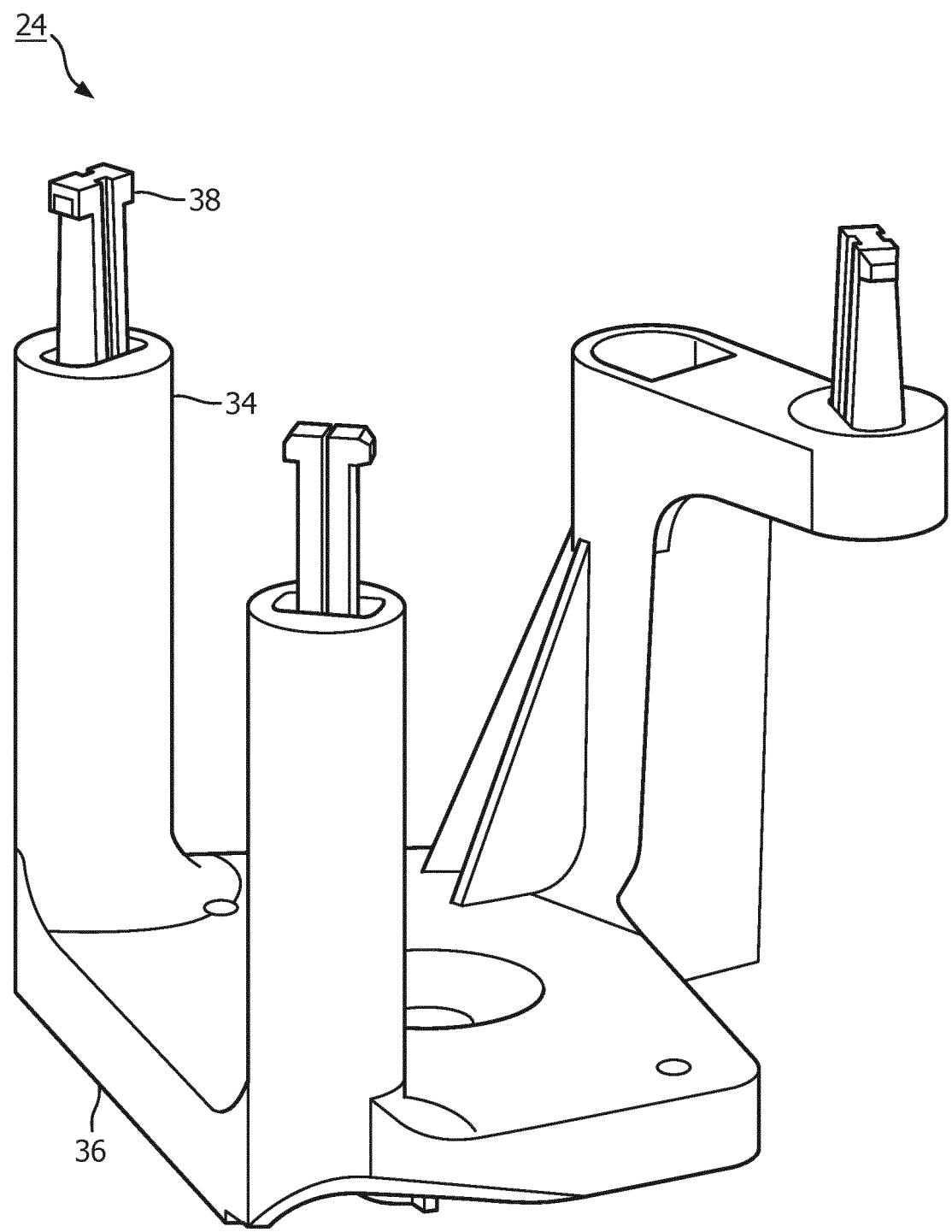
FIG. 6 is a side view schematic representation of a rigid support of a suspension system, in accordance with an embodiment.

Referring to FIG. 6, in one embodiment, is a rigid support 24. The rigid support comprises three extensions 34 extending from the base 36, each ending in a prong 38 configured to fit and lock into an interlocking prong holder 40 of the second resilient element (shown in FIG. 7). The rigid support 24 may also comprise a receiving portion configured to position the first resilient element (not shown). The rigid support may be composed of any material, including metal, plastic, or any other polymer. The rigidity of the rigid support is another configurable component of the suspension system. In other words, the rigidity of the rigid support can be selected to further minimize vibrations and/or noise generated and transmitted by the operative element.

Figure 7:
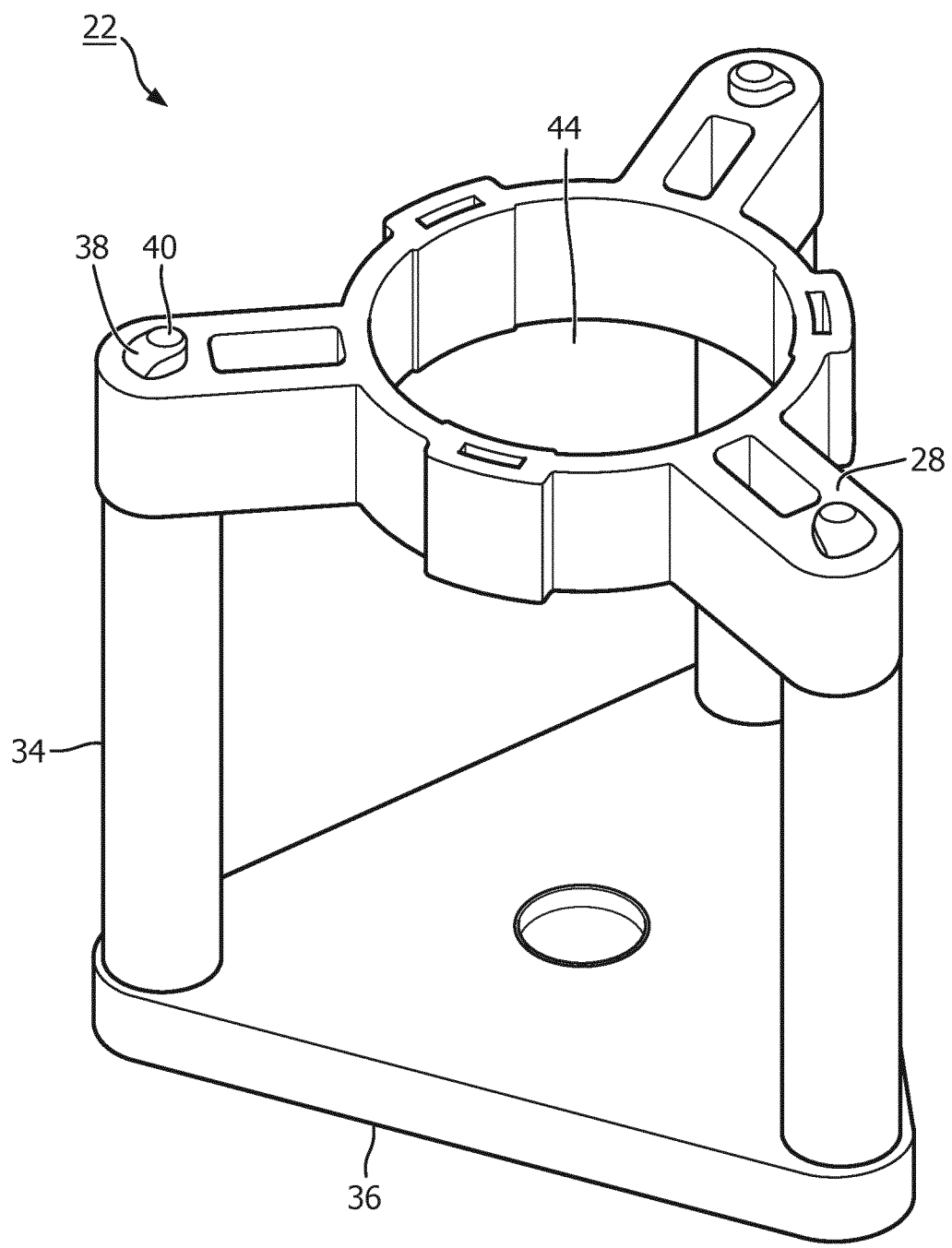

Referring to FIG. 7, in one embodiment, is a schematic representation of a suspension system 22 with a rigid support 24 and a second resilient element 28, without the first resilient element 26. The rigid support 24 comprises a base 36, extensions 34, and prongs 38, and a first resilient element receiving portion. The second resilient element 28 comprises interlocking prong holders 40 and an opening 44 that allows a portion of the operative element to extend through. In this embodiment, the rigid support and second resilient element are assembled without the operative element. Each of the prongs 38 have been extended through the interlocking prong holders 40 and the prongs now function to hold the rigid support and second resilient element interlocked.

Figure 8:
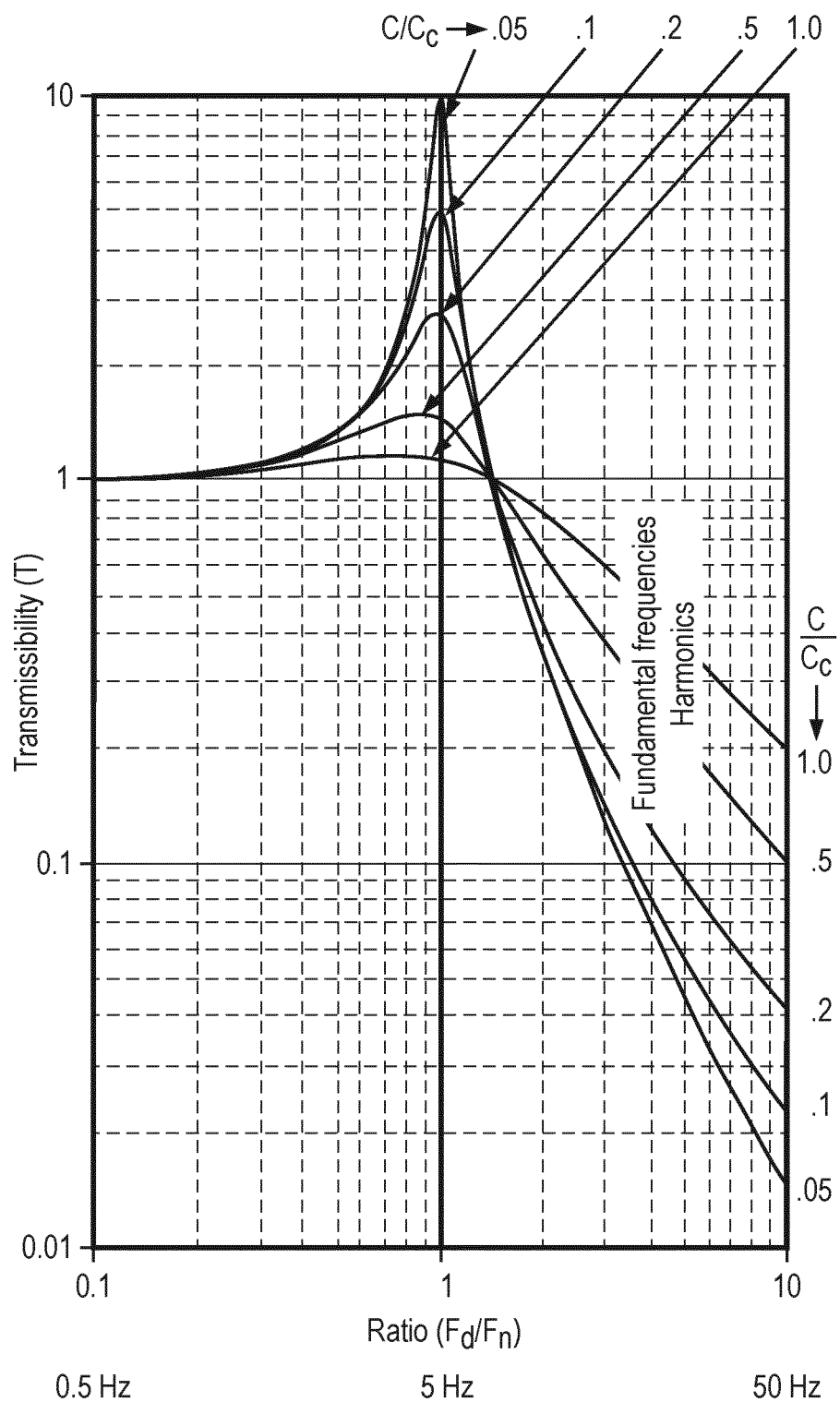
FIG. 8 is a schematic representation of an assembled rigid support and resilient element in a suspension system, in accordance with an embodiment.

Referring to FIG. 8, the natural frequencies of the suspension system described or otherwise envisioned herein are lower than the fundamental frequencies of the operative element, thus significantly reducing more vibration and noise than prior art systems. This is an ideal scenario as all the pump frequencies are in the isolation portion of the plot (T<0.1). To achieve this, the suspension system described or otherwise envisioned herein can take many configurations. The rigid support and first resilient element can be structured or otherwise configured in shape, material, and/or relationship in a wide variety of ways to result in a final structure such that the natural frequency in one or more of the degrees of freedom of the suspension system are tuned into a narrow resonant frequency range by the suspension, where the resonant frequency is less than the drive frequency. Among many other configurations, the dimensions and other parameters of the resilient elements may be adjusted, including but not limited to size, shape, weight, diameter, and thickness of spring coils when it is a spring, strength of magnets when it is a magnet, and more.

According to an embodiment, the flexible suspension elements are very small and soft to achieve a 5 Hz natural frequency. Although very soft flexible elements may have negative effects, these negative effects may be addressed by further design or configuration of the suspension system. Examples of effects that might require addressing include that the operative assembly may have the ability to shift within the suspension system by roughly 10 mm in any direction. Further, the suspension system may be large while the flexible elements may be very small, which might not be robust with normal wear and tear.

To address these issues, the system may utilize a non-linear spring system to keep the frequency low without taking significant space or having significant internal displacement during movement and handling that may be experienced as negative by the user. These non-linear springs can take the form of mechanical designs with over stable position, magnetic, hybrid springs, conical coil, dual pitch, and more. Alternately, a hybrid design with a linear spring with a resonance in the 40-60 Hz range except for rotation which could be non-linear and is the principal direction of vibration from the pump. According to one embodiment, utilizing a suspension with a natural frequency in the 5 Hz range isolates vibrations that are easily heard, reducing A-weighted sound power to a maximum extent.

According to one embodiment the spring rate of the first resilient element is non-linear with an increasing spring rate from the nominal position. Further, the spring rate may not be high enough with excursion of the pump under normal operation to have a resonant frequency of 5 Hz.

Figure 9:
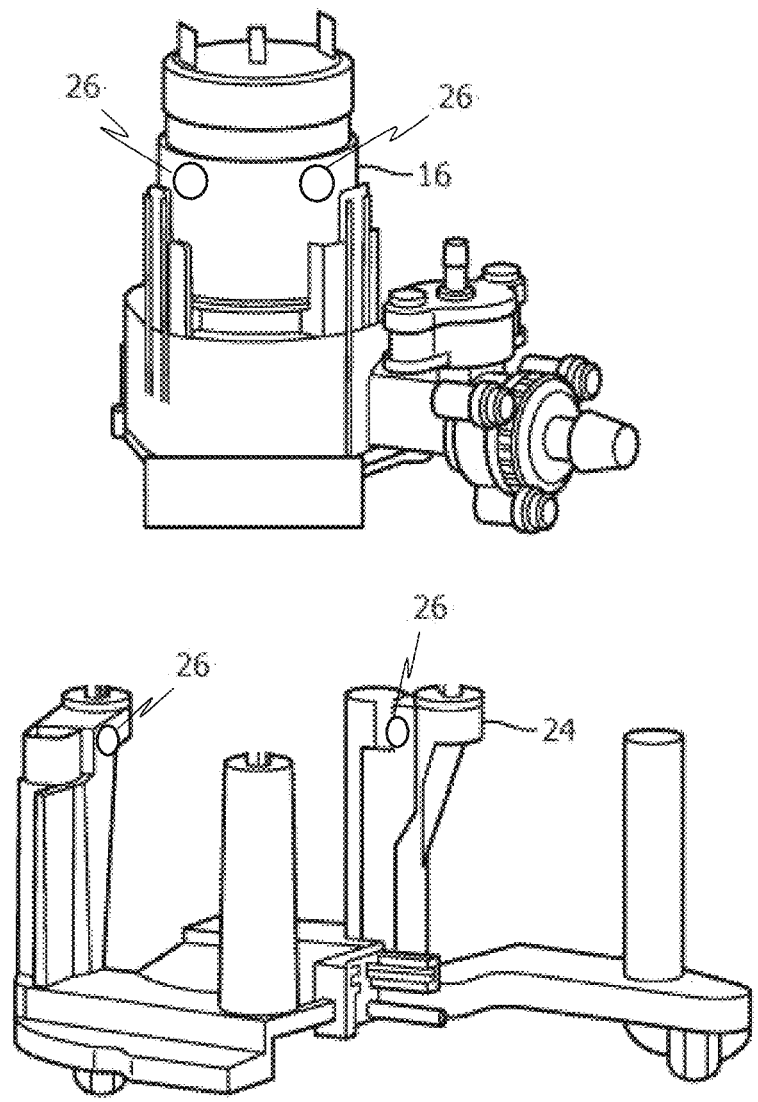
FIG. 9 is a schematic representation of a portion of a magnet system utilized as a non-linear spring, in accordance with an embodiment.

The non-linear spring system 26 can take many different forms, including but not limited to one or more magnets. Referring to FIG. 9, in one embodiment, is a schematic representation of a portion of a magnet system utilized as a non-linear spring. In this embodiment and variations thereof, there is a configuration of magnets of the same pole on a surface of an operative element 16 (not shown) and on an opposing surface of the rigid structure 24. The magnets on the operative element surface are directly opposing the magnets on the surface of the rigid structure, and since they have the same pole facing toward each other, there is a repulsive force. The two poles may both be North or South. As discussed herein, the magnetic repulsion could be replaced by non-linear mechanical springs such as conical coil, barrel spring, dual-pitch coil, and other non-linear springs, as well as combinations thereof. According to an embodiment, the non-linear resilient element may comprise plastic and/or metal.

Figure 10:
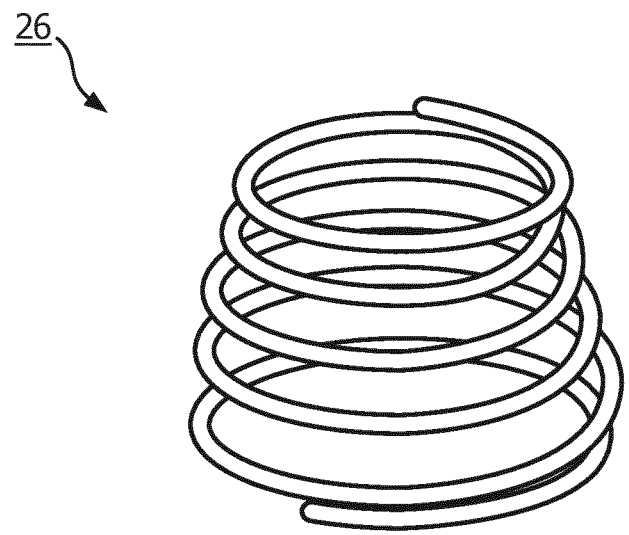
FIG. 10 is a schematic representation of a conical and/or tapered spring utilized as a non-linear spring, in accordance with an embodiment.
Figure 11:
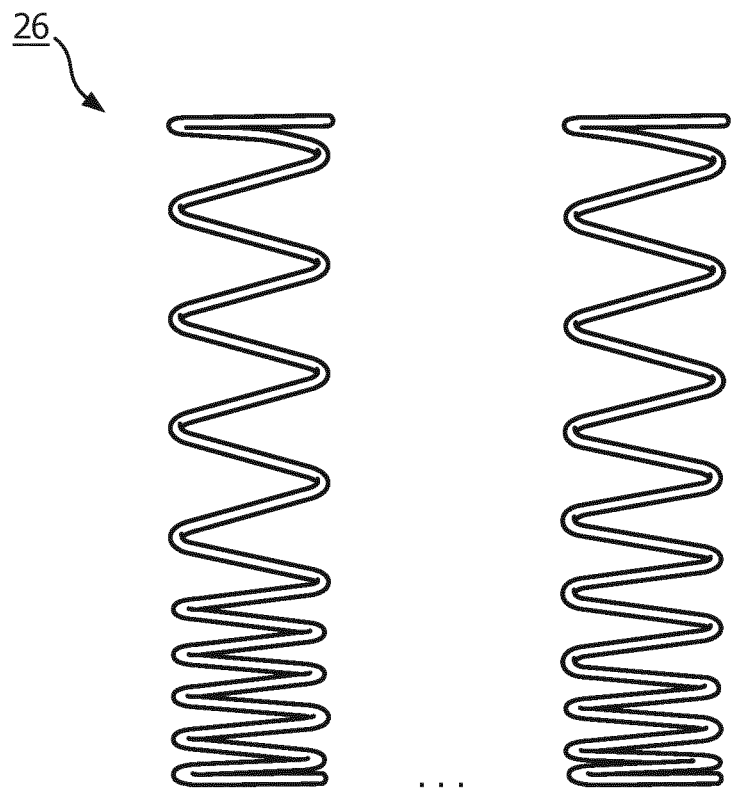
FIG. 11 is a schematic representation of dual-pitch compression springs utilized as a non-linear spring, in accordance with an embodiment.

Referring to FIGS. 10 and 11, in various embodiment, are schematic representations of non-linear springs that may be utilized in the suspension system to tune the natural frequency in one or more of the degrees of freedom of the suspension system into a narrow resonant frequency range by the suspension, such that the resonant frequency is less than the drive frequency. The non-linear springs include a conical and/or tapered spring in FIG. 10 and two different dual-pitch compression springs in FIG. 11.

Figure 12:
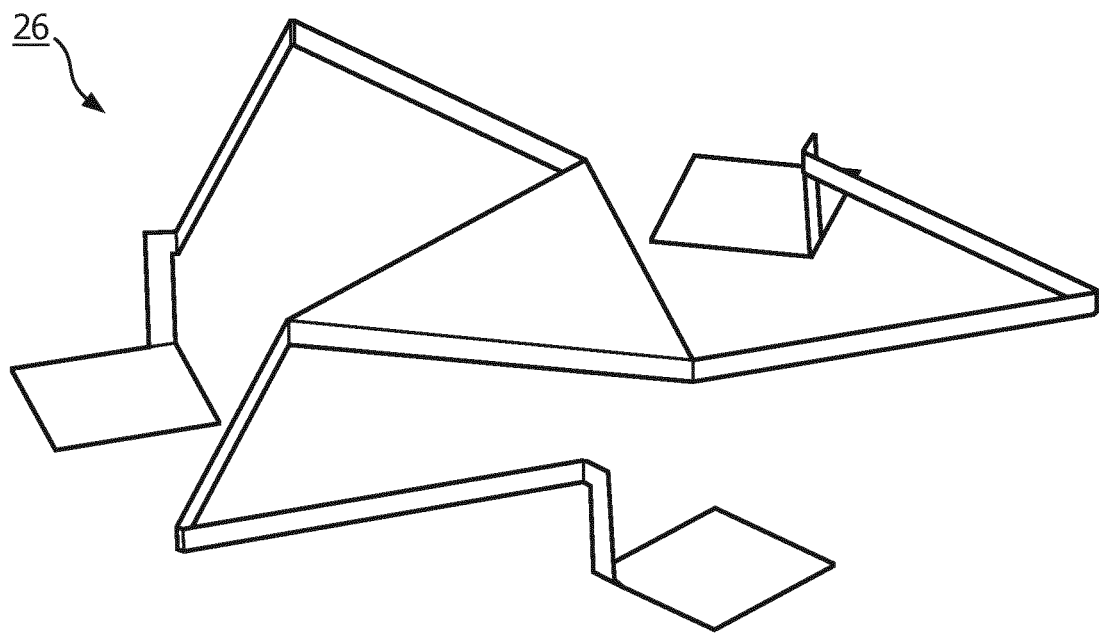
FIG. 12 is a schematic representation of a non-linear spring comprising three long resilient arms, in accordance with an embodiment.

Referring to FIG. 12, in one embodiment, is a schematic representation of a non-linear spring that can be utilized in the suspension system described or otherwise envisioned herein. The non-linear spring comprises three long resilient arms configured to provide configured to create a resilient force against one or more degrees of freedom of vibrations generated by the pump assembly. The short vertical leg on the end of each arm provides additional torsion that reduces Z stiffness. Each of the resilient arms is a distinct spring, and thus the resilient structure comprises three or more metal springs in tension supporting the operative element.

The non-linear spring also comprises a platform on which the operative assembly may directly or indirectly rest. The non-linear spring may be composed of any material configured to provide the desired resilience, including but not limited to metal. The design of the non-linear spring in FIG. 12 has natural frequencies below 5 Hz in the X, Y, and Z directions.

Figure 13:
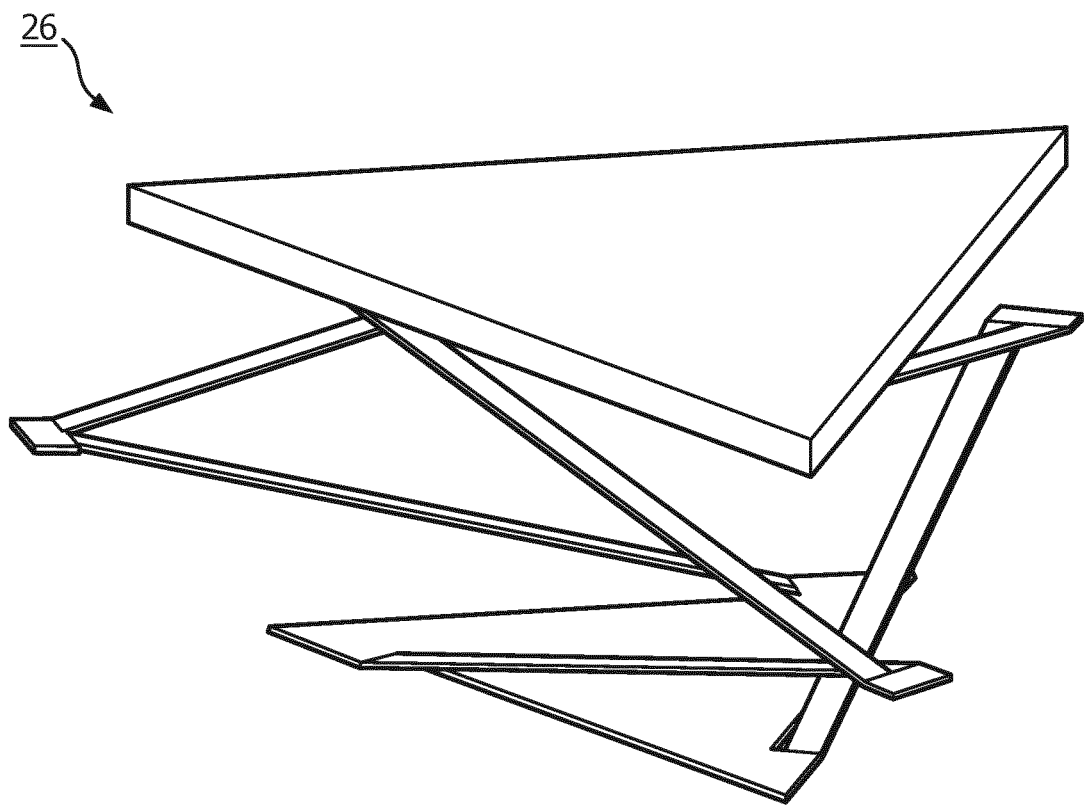
FIG. 13 is a schematic representation of a non-linear spring comprising three staircase arms, in accordance with an embodiment.
Figure 14:
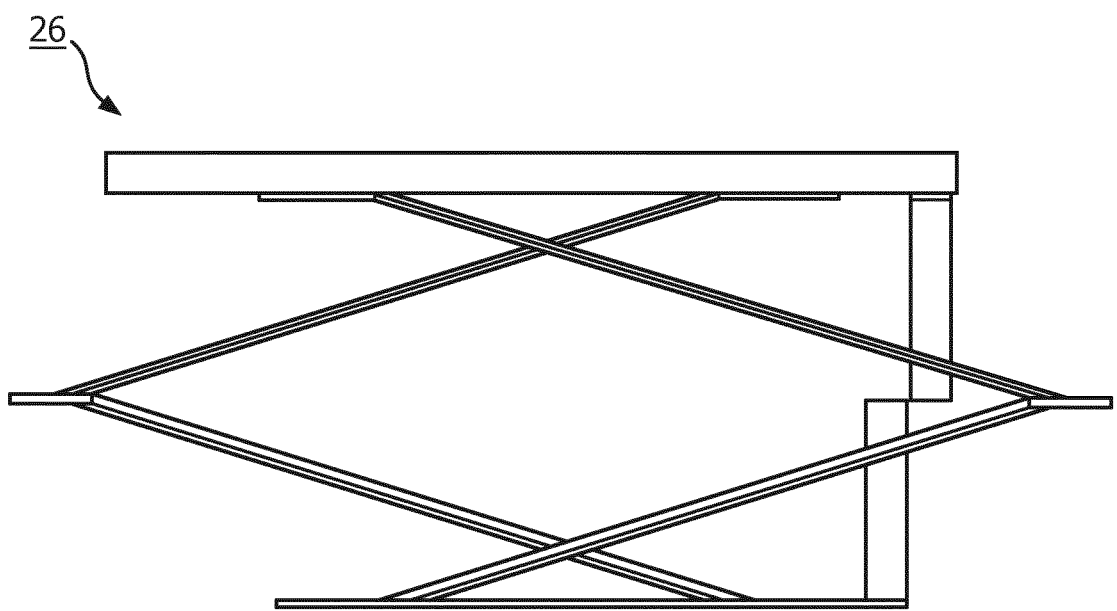
FIG. 14 is a schematic representation of a non-linear spring comprising three staircase arms, in accordance with an embodiment.
Figure 15:
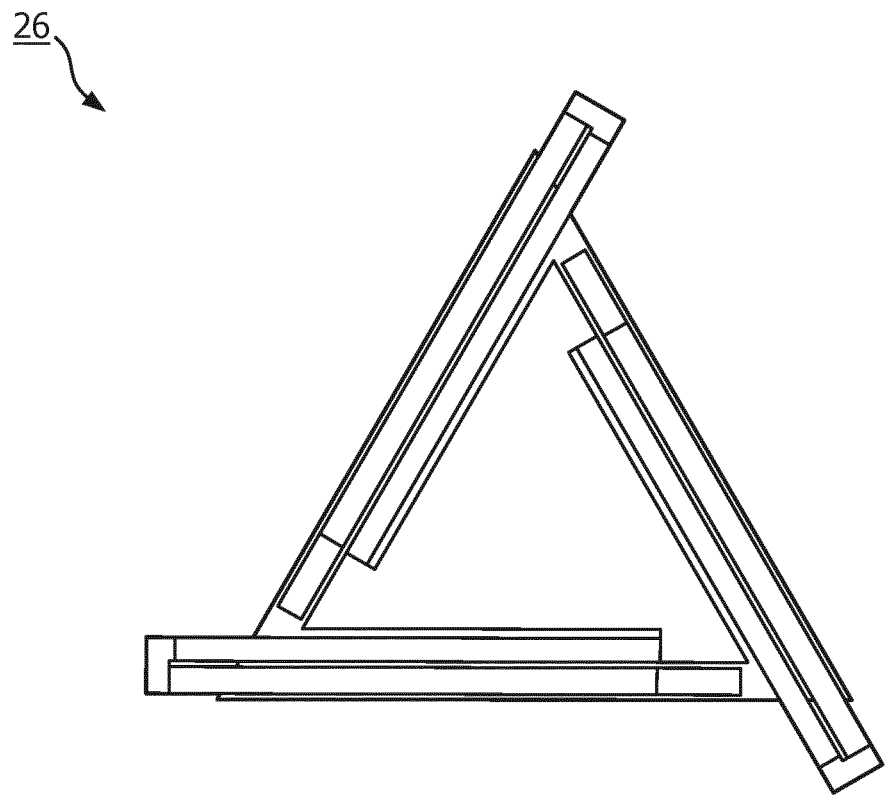
FIG. 15 is a schematic representation of a non-linear spring comprising three staircase arms, in accordance with an embodiment.

Referring to FIGS. 13-15, according to an embodiment, are schematic representations of difference views of a non-linear spring that can be utilized in the suspension system described or otherwise envisioned herein. The non-linear spring comprises three staircase arms configured to create a resilient force against one or more degrees of freedom of vibrations generated by the pump assembly. The staircase arrangement of leaf spring elements are connected in a plurality of different orientations to create a compact resilient element. Instead of a design with just bends in the arms, the staircase arrangement of the spring arms minimizes the size of the flat pattern. These non-linear springs can be designed to have natural frequencies below 5 Hz in the X, Y, and Z directions.

Figure 16:
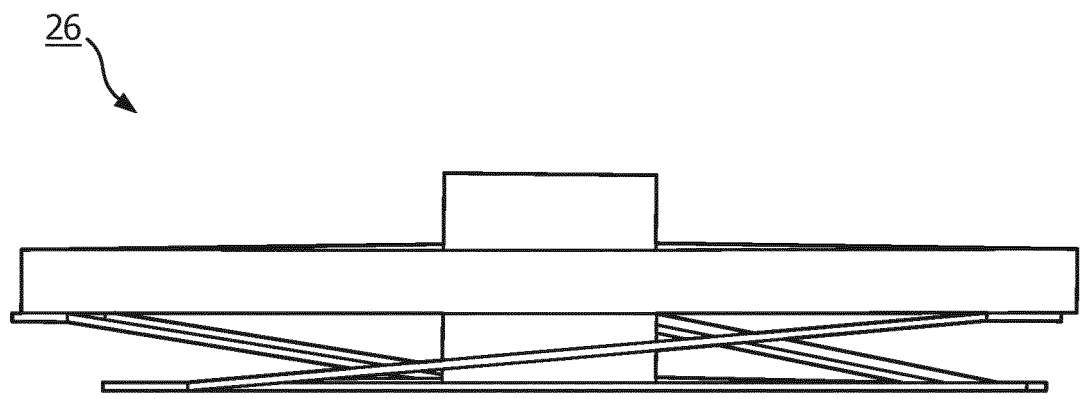
FIG. 16 is a schematic representation of a non-linear spring, in accordance with an embodiment.

Referring to FIG. 16 is a schematic representation of a non-linear spring that can be utilized in the suspension system described or otherwise envisioned herein. The non-linear spring comprises three resilient arms configured to provide configured to create a resilient force against one or more degrees of freedom of vibrations generated by the pump assembly.

Figure 17:
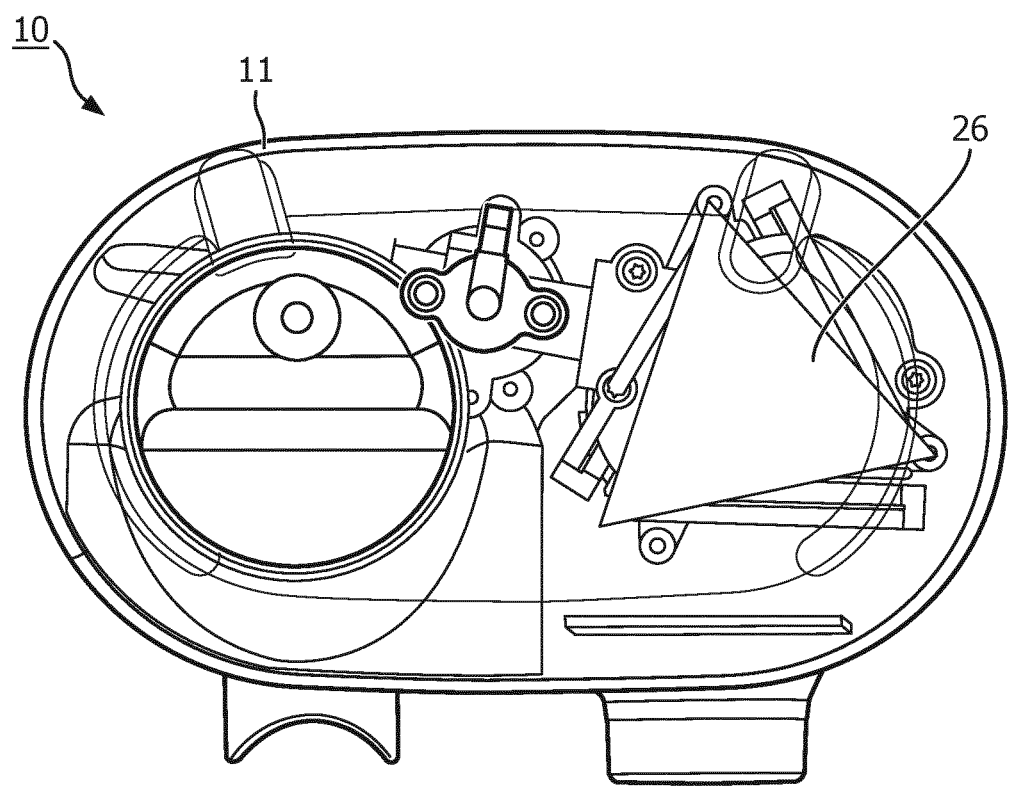
FIG. 17 is a bottom view of a device with a suspension system, in accordance with an embodiment.

Referring to FIG. 17 is a bottom view of a device 10 with a suspension system. The suspension system comprises a non-linear spring 26 with staircase arms. In this embodiment, the spring arms are shorter and the bend angles are reduced. The shallower bend angles make the suspension shorter and keep the overall spring constant lower.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A suspension system configured to minimize transmission of acoustic and vibrational energy in an oral irrigator device, comprising:
   a rigid support;
   an operative element positioned within the rigid support and comprising a drive frequency when the device is in operation, wherein the operative element is a pump assembly; and
   a resilient element engaging the rigid support and configured to create a resilient force against six degrees of freedom of vibrations generated by the operative element;
   wherein the natural frequency in one or more of the degrees of freedom of the suspension system, in the degrees of freedom of interest, are tuned into a narrow resonant frequency range by the suspension system, and wherein the resonant frequency is less than the drive frequency; and
   wherein the resilient element is a non-linear resilient element connecting the operative element with the rigid support and centering the operative element within a low force region of the non-linear resilient element and an intended operating position free of other components except for the non-linear resilient element when positioned upright for normal operation under gravitational load.

2. The suspension system of claim 1, wherein the suspension comprises one or more resilient elements configured to create a resilient force against all six degrees of freedom of vibrations generated by the operative element and further configured to center the operative element within an intended operating position free of other components except for the one or more resilient elements when positioned upright for normal operation under gravitational load.

3. The suspension system of claim 1, wherein the resilient element comprises three or more metal springs in tension supporting the operative element.

4. The suspension system of claim 1, wherein the non-linear resilient element comprises one or more opposing magnets.

5. The suspension system of claim 1, wherein the non-linear resilient element comprises a series of resilient elements configured such that the series of resilient elements each engage when the operative element leaves an intended operating position, thereby increasing stiffness of the series of resilient elements when oriented other than the intended operational position to stop unwanted impact of the device.

6. The suspension system of claim 1, wherein the resonant frequency is approximately 5 Hertz.

7. The suspension system of claim 1, wherein the drive frequency is between approximately 10 and 30 Hertz.

8. The suspension system of claim 3, wherein the suspension system is configured to limit movement of the operative element to less 10 mm in any direction from an intended operating position.

9. A device comprising a suspension system configured to minimize transmission of acoustic and vibrational energy generated by the device, comprising:
   a housing;
   an operative assembly positioned within the housing and comprising a drive frequency when the device is in operation;
   a resilient element connecting the operative assembly with the housing; and
   wherein the natural frequencies of the suspension system are tuned into a resonant frequency below 10 Hertz by an elastomeric element and the resilient element, and wherein the resonant frequency is less than the drive frequency;
   wherein the resilient element is a non-linear resilient element connecting the operative assembly with a rigid support and centering the operative assembly within a low force region of the non-linear resilient element and an intended operating position free of other components except for the non-linear resilient element when positioned upright for normal operation under gravitational load.

10. The device of claim 9, wherein the device is an oral irrigator and wherein the operative assembly is a pump assembly.

11. The device of claim 9, wherein the rigid support is positioned between the housing and the operative assembly, wherein the operative assembly is positioned within the rigid support, and wherein the resilient element connects the operative assembly to the rigid support and the resilient element connects the lower portion of the operative assembly to the rigid support.

12. The device of claim 9, wherein the resonant frequency is approximately 5 Hertz.

13. The device of claim 9, wherein the drive frequency is between approximately 10 and 30 Hertz.

14. The device of claim 9, wherein the resilient element comprises three or more metal springs in tension supporting the operative assembly.

15. The device of claim 9, wherein the non-linear resilient element comprises one or more springs, selected wherein the one or more springs comprise a staircase arrangement of leaf spring elements connected in a plurality of different orientations to create a compact resilient element.

16. The device of claim 9, wherein the non-linear resilient element comprises one or more opposing magnets.

* * * * *